United States Patent [19]
Pitner

[11] 3,977,736
[45] Aug. 31, 1976

[54] RECTILLINEAR GUIDE DEVICE

[75] Inventor: Alfred Pitner, Paris, France

[73] Assignee: Nadella, France; a part interest

[22] Filed: May 14, 1975

[21] Appl. No.: 577,205

[30] Foreign Application Priority Data
May 17, 1974 France .................. 74.17350

[52] U.S. Cl. .................. 308/6 C; 308/215
[51] Int. Cl.² .................. F16C 29/06
[58] Field of Search .............. 308/6 R, 6 C, 207 R, 308/215

[56] References Cited
UNITED STATES PATENTS

| | | | |
|---|---|---|---|
| 3,357,753 | 12/1967 | Ionov | 308/6 C |
| 3,642,330 | 2/1972 | Newman | 308/6 C |
| 3,655,247 | 4/1972 | Grover | 308/6 C |

Primary Examiner—M. H. Wood, Jr.
Assistant Examiner—Gene A. Church
Attorney, Agent, or Firm—Robert E. Burns; Emmanuel J. Lobato; Bruce L. Adams

[57] ABSTRACT

The bearing structure for guiding two relatively moving parts comprises a first linear raceway and second linear raceway connected to the first raceway by two circularly-shaped passages for rolling elements interposed between the raceways. The first raceway has a convex transverse profile.

7 Claims, 8 Drawing Figures

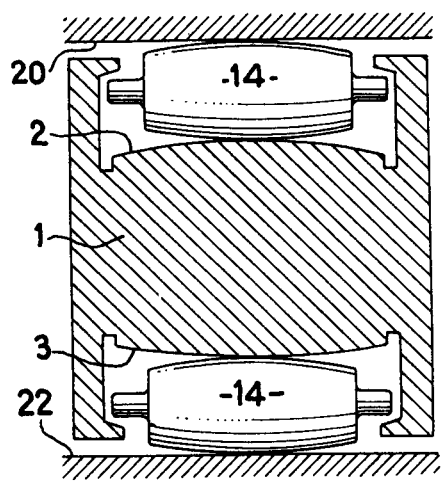
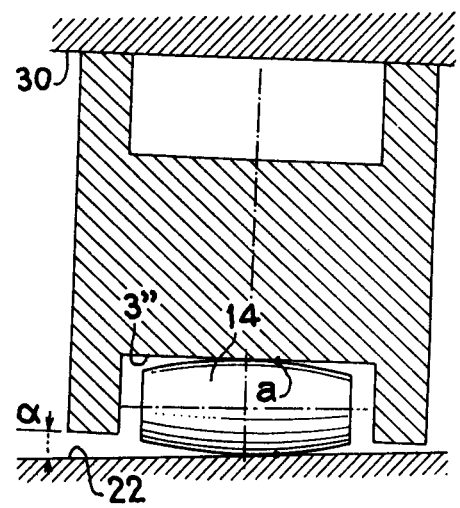
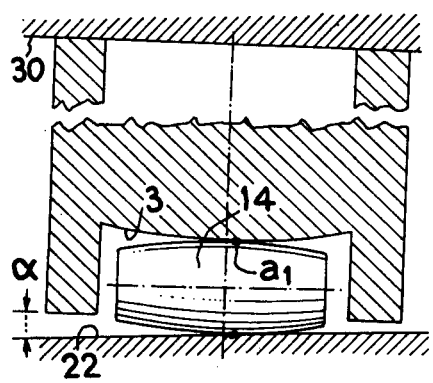
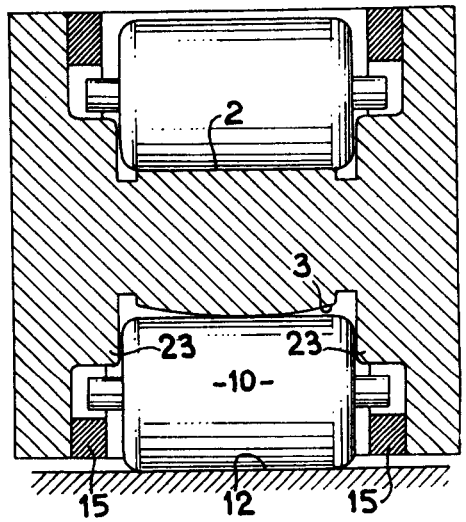

RECTILLINEAR GUIDE DEVICE

The present invention relates to a bearing structure for guiding two parts which undergo a relative movement of translation, comprising a first linear raceway, rolling elements constituted by rollers or needles adapted to roll in contact with said raceway and with a rolling surface of one of the parts, and a second linear raceway parallel to the first raceway and connected to the first raceway by two circular-shaped passages for returning the rolling elements to the first raceway.

In order to ensure that such a bearing structure, if it comprises rolling elements having rectilinear generatrices and planar raceways, be really effective, the first raceway and the complementary rolling surface must be exactly parallel to each other. Indeed, any non-parallelism between these surfaces, or between the rolling surface and the surface of the other part to which the bearing structure is fixed, results in a pivoting of the rolling elements and in a displacement toward one of the ends of the rolling elements of the zone of contact between the rolling elements and the raceway which creates an overloading of the rolling elements and correspondingly premature wear and deterioration of the bearing structure.

An object of the present invention is to overcome this drawback by providing a bearing structure which has means for ensuring a satisfactory operation in the case of non-parallelism. In the bearing structure according to the invention, the first linear raceway has a convex transverse profile so that the zone of contact of the rolling elements with the raceway remains localized in the centre region of the rolling elements and thus avoids any concentration of forces on the ends of the rolling elements. Possible defects in any of the aforementioned surfaces or defects resulting from a relatively incorrect disposition of any two thereof, are automatically compensated for by the use, in accordance with the invention, of a convex raceway and premature deterioration of the device is avoided.

Moreover, the presence of a convex raceway results in a more regular operation of the bearing structure by avoidance of variations in the forces to be applied particularly upon modification of the direction of displacement.

According to the present invention, the bearing structure may have a single, or preferably, two convex raceways. Such is the case for example when the guide device is adapted to be disposed between two moving parts which load all the rolling elements moving along the two parallel raceways. Note that the provision of two convex raceways permits in this particular case, also the elimination of the harmful effects due to non-parallelism between the two rolling surfaces each connected to one of the aforementioned moving parts.

In a first embodiment, the rolling elements are constituted by rollers or needles having rectilinear generatrices.

In a second embodiment, the rolling elements have a curved or barrel-shaped rolling surface.

The ensuing description of embodiments, given solely by way of examples to which the invention is not intended to be limited, with reference to the accompanying drawings will show the advantages and features of the invention.

In the drawings:

FIG. 5 is a view similar to FIG. 2 of another embodiment relating to a needle bearing structure disposed between two moving parts;

FIG. 6 is a partial diagrammatic sectional view of a needle bearing structure according to the prior art in the case of non-parallelism between the rolling surface and the surface of the support to which the bearing structure is secured;

FIG. 7 is a diagrammatic view corresponding to FIG. 6 in the case of a bearing structure according to the invention, and, FIG. 8 is a view of a modification of the bearing structure shown in FIG. 2.

Figure 1:
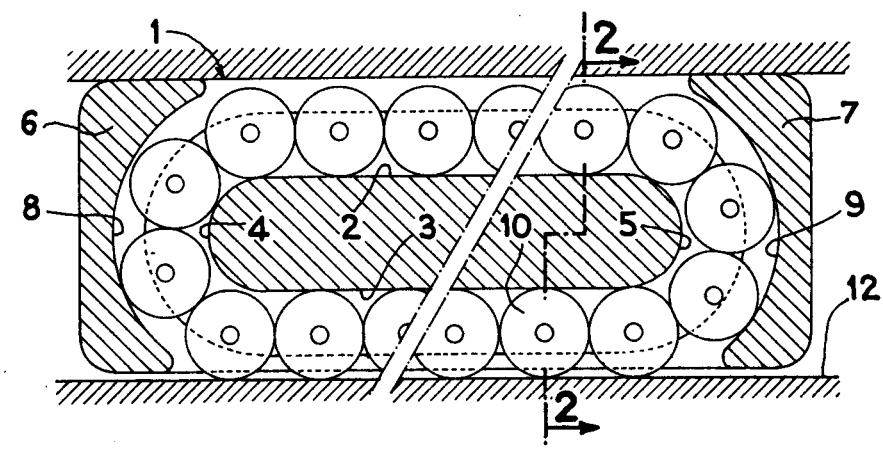
FIG. 1 is a longitudinal sectional view of a roller bearing structure.

The bearing structure shown in FIG. 1 comprises a body 1 in which there are formed two parallel linear raceways 2 and 3 which are interconnected at their ends by inner semi-circular raceways 4 and 5. Two end walls 6 and 7 are fixed to the body 1 and each comprise an outer semi-circular guide surface 8, 9 parallel to the raceway 4 or 5 and defining with the latter a passage for the circulation of the rolling elements 10 which are constituted, in the illustrated embodiment, by cylindrical rollers having rectilinear generatrices.

Figure 2:
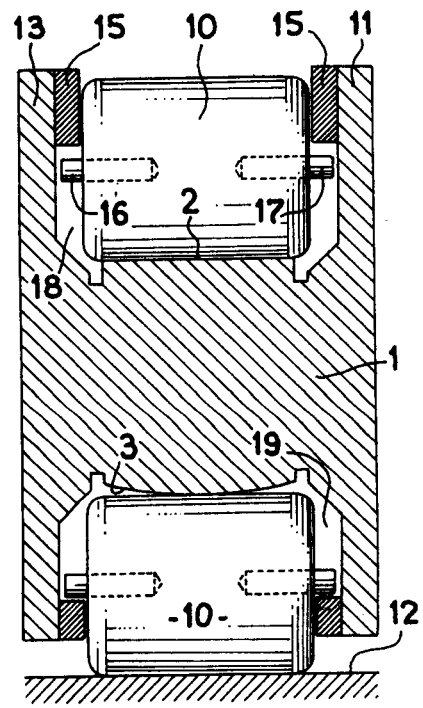
FIG. 2 is a sectional view taken on line 2—2 of FIG. 1.

The body 1 has in cross-section substantially the shape of an H as shown in FIG. 2, the raceways 2 and 3 being constituted by two lateral surfaces of the centre crossmember of the H. The limbs 11 and 13 of the H define with each of the surfaces 2 and 3 a recess 18, 19, respectively, for receiving the rolling elements 10. According to one embodiment, each of the limbs is provided with a ring 15 which constitutes retaining means for the rolling elements 10 and may, if desired, cooperate for this purpose with, for example, pins 16, 17 fixed, or formed, in each of the parallel end surfaces of the rollers 10 which are guided in contact with the ring 15.

The depth of the lower recess 19 is such that the rollers 10 slightly project outwardly from this cavity and come in contact with the rolling surface 12 of a part which moves relative to the body 1 of the bearing structure. On the other side of the body 1, the rollers 10 are completely contained within the recess 18.

The lower raceway 3 has, facing the rollers 10, a convex cross-section or profile defined by a radius which is large with respect to that of the rollers.

Figure 3:
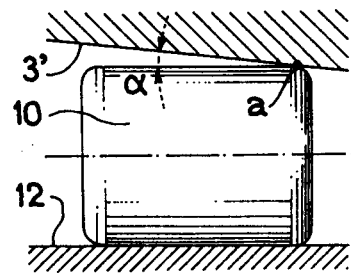
FIG. 3 is a partial view of a bearing structure corresponding to the prior art and showing, in the case of non-parallelism, the relative position of a rolling element and the planar raceway.
Figure 4:
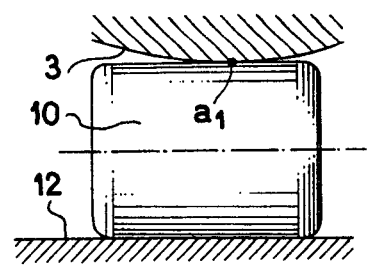
FIG. 4 is a view corresponding to FIG. 3 in the case of a bearing structure according to the invention.

FIGS. 3 and 4 serve to explain the operation and advantages of the bearing structure according to the invention.

It is difficult to avoid in a device having a planar raceway 3' the formation of an angle α, however small it may be, between the raceway and the rolling surface 12 of the moving part. As a result of the existence of the angle α, the zone of contact of the rolling element 10 with the raceway 3' tends to be located at the end $a$ of the roller 10 and this produces a premature wear of the bearing (FIG. 3). By employing a convex raceway 3 according to the invention, the contact $a_1$ with this raceway is always located in the centre region of the rolling element owing to the fact that the latter is able to tilt relative to the raceway 3 about the point of contact, as shown in FIG. 4. This tilting has for effect to compensate for defects in the manufacture of the bearing structure and/or in the rolling surface or for the defects resulting from an incorrect disposition of the bearing structure with respect to the moving part. The convex raceway ensures that the roller 10 has a position in which its axis is always parallel to the line 12 (FIGS. 3 and 4) so that the rolling may effectively occur with limited stresses. There are avoided in this way the wear and deterioration produced by the localized contact between the end of the roller and the raceway met with in conventional bearings when the two planar rolling surfaces are not exactly parallel to each other.

In order to permit utilisation of the bearing structure shown in FIGS. 1 and 2 between two rolling surfaces respectively integral with a first and a second moving part located on each side of the body 1, in which case the recesses 18, 19 have equal depths, both raceways 2 and 3 are preferably given a convex cross-section or profile, the convexity being directed in opposite directions so as to compensate for defects in respect of all the active rollers.

FIG. 5 shows such a bearing structure employing needles 14 as the rolling elements. In this bearing structure the two raceways 2 and 3 have a convex surface and the needles 14 in contact with each of these raceways roll along planar rolling surfaces 20 and 22 respectively integral with a first and a second moving part. The needles 14 can be constructed in the usual way with rectilinear generatrices or have a barrel-shaped rolling surface. It will be clear that the presently-described arrangement permits a compensation for all defects inherent in the bearing structure and/or in the surfaces 20 and 22 and in addition any non-parallelism between these two surfaces.

FIG. 6 shows diagrammatically the position assumed by the needles 14 (point of contact $a$ located close to the end of the needles) of a bearing stucture having a rectilinear raceway 3'' of the prior art in the case of non-parallelism between the rolling surface 22 pertaining to the moving part and the rolling surface 30 of the support to which the bearing structure is fixed.

On the other hand, FIG. 7 shows the position which the needle 14 rolling at $a_1$ would tend to assume in the case of the use, under the same conditions as before, of a bearing structure having a convex raceway 3.

Bearing structures such as that shown in FIG. 1 are particularly well adapted to the guiding of parts of machine-tools undergoing a reciprocating rectilinear motion, but they may also be employed in many other devices for guiding two relatively movable surfaces.

In the embodiment shown in FIG. 8, which represents a modification of the bearing structure shown in FIG. 2, the end surfaces of the rollers 10 are guided in contact, not with the rings 15, but with radial side surfaces 23 formed in the body 1 of the bearing structure. These side surfaces are not compulsory in the region of the return raceway 2, which can simplify manufacture.

Various other modifications may of course be made in the embodiments just described without departing from the scope of the invention.

Having now described my invention what I claim as new and desire to secure by Letters Patent is:

1. In a bearing structure for guiding two parts undergoing a relative movement of translation comprising means defining a body, a first linear raceway on the body, rolling elements rollingly engaging said raceway and capable of rollingly contacting a rolling surface of one of said parts, a second linear raceway parallel to the first raceway on the body, two circularly-shaped passages interconnecting the first and second raceways for the recirculation of the rolling elements, the improvement comprising forming the first linear raceway with a convex transverse profile which profile differs from the profile of the generatrices of the rolling elements so that there is a point contact between said convex transverse profile and the rolling elements.

2. A bearing structure as claimed in claim 1, wherein the second linear raceway has a convex transverse profile.

3. A bearing as claimed in claim 1, wherein the rolling elements have rectilinear generatrices.

4. A bearing as claimed in claim 1, wherein the rolling elements have convex generatrices.

5. A bearing as claimed in claim 1, wherein the body defines planar surfaces adjacent ends of the rolling elements adjacent at least the first raceway and the rolling elements have planar end surfaces which are in contact with and guided by said planar surfaces of the body.

6. A bearing as claimed in claim 1, wherein the body defines a retaining surface and the rolling elements comprise a projecting portion which axially projects from each of their ends and cooperates with the retaining surface.

7. A bearing as claimed in claim 1, comprising two rings which are attached to the body adjacent ends of the rolling elements and define planar guide surfaces for adjacent end surfaces of the rolling elements and a retaining surface, the rolling elements comprising a projecting portion which axially projects from each of their ends and cooperates with the retaining surface.

* * * * *